Figure 1:
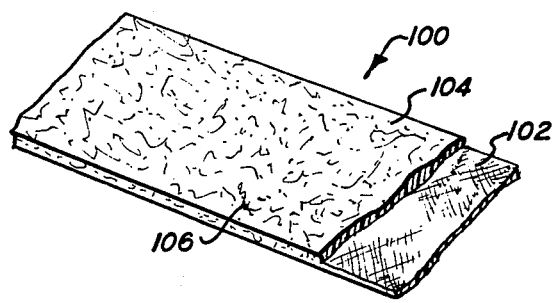

United States Patent
Pedlow

[11] 4,018,962
[45] Apr. 19, 1977

[54] ARC AND FIREPROOFING TAPE

[76] Inventor: J. Watson Pedlow, 2500 Pine Oak Drive, Media, Pa. 19063

[22] Filed: Apr. 9, 1975

[21] Appl. No.: 566,170

[52] U.S. Cl. .................. 428/245; 106/15 FP; 156/78; 174/121 A; 260/2.5 FP; 427/120; 428/253; 428/255; 428/265; 428/267; 428/268; 428/308; 428/310; 428/317; 428/325; 428/327; 428/921

[51] Int. Cl.² .................................. C09K 3/28

[58] Field of Search ............. 260/24, 2.5 FP; 428/920, 921, 245, 265, 267, 268, 288, 290, 317, 302, 308, 323, 324, 325, 402, 406; 174/121 A, 121 SR; 106/15 FP; 427/120; 156/78, 79; 264/51, 41, DIG. 5, DIG. 6, DIG. 17

[56] References Cited
UNITED STATES PATENTS

| 2,972,554 | 2/1961 | Muskat et al. | 428/310 |
| 3,050,427 | 8/1962 | Slayter et al. | 428/245 |
| 3,576,940 | 5/1971 | Stone et al. | 174/121 |
| 3,616,123 | 10/1971 | Reynolds et al. | 428/920 |
| 3,623,940 | 11/1971 | Gladstone | 428/921 |
| 3,642,531 | 2/1972 | Peterson | 428/921 |
| 3,668,302 | 6/1972 | Boland et al. | 106/15 FP |
| 3,682,692 | 8/1972 | Lamson et al. | 428/921 |
| 3,717,526 | 2/1973 | Visnovsky et al. | 156/78 |
| 3,917,547 | 11/1975 | Massey | 428/308 |
| 3,928,210 | 12/1975 | Peterson | 428/921 |

Primary Examiner—James J. Bell

[57] ABSTRACT

Electric arc and flame protective tape for electrical, particularly for high voltage electrical cables and complex electrical, splices, junctures and the like, comprises a base sheet fabric coated with a thermoplastic resin preferably from a liquid polyvinyl chloride plastisol, reinforced and protected against destruction by pre-melting with a filler of heat resistant fiber, and containing flame and fire-retardant plasticizer as well as fire-retardant, preferably intumescent, and heat stabilizing substances. The tape is flexible and elastomeric and may be wrapped about the cable or joint, protectively to further insulate and protect it against electrical arcing, heat or fire.

9 Claims, 2 Drawing Figures

ARC AND FIREPROOFING TAPE

This invention relates to flexible electrical arc and flame-resistant tape for use as a protective covering for electrical cables, splices, junctures and appurtenant electrical equipment, including high voltage, as well as critical circuits, to fireproof and protect the same against electrical arcing, heat and flame damage, such as from short circuiting therein, or from fire developed in neighboring cables and equipment. More particularly the tape hereof comprises a base sheet fabric which is coated with a low melting, easily formed thermoplastic resinous material, filled with a heat stable fiber to inhibit its fluidity before decomposition by heat, arcing and flame; and heat activated foaming, fireproofing and intumescing substances, to convert said coating to a fire and heat protective foam remaining protectively in place about a tape wrapped electrical element such as a cable, even after the base resin or fabric is decomposed by heat.

The tape thereof is variously sized as continuous rolls of flexible tape easily wrapped flexibly and manually about a cable, or several cables, or cable splices for quick and easy assembling of a cable network in a manhole; or about cables, transformers, electrical switch boxes or the like in buildings. It can also be used in conjunction with precast sheathing or boot materials as described in my companion co-pending application, ARC AND FIREPROOFING BOOT, each of the tape hereof or precast boot materials forming a protective insulation, fireproofing the cable against arcing, high heat or flame in the tape protected cables and equipment, or in neighboring cables.

Flexible, laminated products prepared by the coating or impregnation of a fabric base sheet with polyvinyl chloride plastisols are known in the electrical insulation art. Often these products are applied in the form of sheets typically as tapes as covering for electrical conductors. Frequently they form an outer covering separated from the conducting core by a layer of another, primary, insulating material as, for example, lead sheathing. It is especially desirable to provide such an external tape covering when the primary insulator is, as in the case of lead, a low melting material; or when the primary electrical insulating material is relatively flammable or rapidly disintegrable upon exposure to flame or intense heat, as for example, in the case of cotton and rayon wire coverings and elastomeric wire coverings, e.g., those made of polyolefins such as polyethylene and polypropylene. The coated fabric of the present invention provides an insulating material having excellent qualities of flame and arc resistance. When employed, for instance, as a tape for wrapping protectively around electrical cables, splices and conductors often high voltage, the protection against heat and flame which it affords is significantly improved over such prior polyvinyl chloride-coated tapes.

It is also known in the art to mount a flexible plastic such as rubber, polyethylene, polyethylpropylene, and even polyvinyl chloride commonly available as a plastisol upon a fibrous tape-like backing, or upon wire as a carrier for such coating, and to set the coating thereon with moderate heat. It is also known to apply such coating as a tape by flexibly winding about an electrical cable or upon complex cable splices for insulation thereof, usually against corrosion, ambient moisture or other minor contaminants. Such tape was proposed even to have various fibers or fabrics either embedded therein or used as a backing therewith for purely ambient temperature mechanical reinforcement.

The standards in the art for heat resistant tape, particularly to be applied about high voltage cable for fire and flame protection, are very high, and such tapes as were known are inadequate to satisfactorily meet such standards. For instance, protective tape for high voltage cable is now required to resist heat of great intensity such as might be developed in electrical arcing and short circuits, or by the flame or fire occurring from the spillage of oil from neighboring oil insulated cables and transformers disposed near the cables or equipment to be protected. The present standards of heat and arcing resistance for such tapes is that they must be resistant to directly applied destructive flame devices, including the heat developed by cutting torches or the like, tests against which such prior art tapes are ineffective.

One primary difficulty of ordinary insulating tape having a low melting resin base, such as polyvinyl chloride plastisol, most conveniently used, and even other low melting thermoplastics is that the resin melts and flows away under the applied heat, and will not therefore, protectively insulate the site where it is needed. The present fireproofing tape, while using an easy flowing and easily applied thermoplastic resinous composition, includes a heat resistant fiber distributed therein which both inhibits the resin from flowing away from the site of high heat, but also includes fireproofing and intumescing substances which foam and release fireproofing vapors, so that both serve to restrain the composition from flowing under heat. Under the flaming or arcing heat it chars to a heat insulating coating fixed protectively about the lead cable usually to be protected. The fiber sheet strip or base provides the necessary support for the fluidized composition while it is being formed into a tape and provides a tensile strength while it is being wrapped about the cable. The tape remains flexible with the composition hereof in its final form for application as a tape so that it can be quickly applied and secured by wrapping about the electrical cables or equipment to be protected.

According to the present invention a thermoplastic readily melted base resin has incorporated therein a high melting fiber substance, evenly distributed as a filler through the liquid or molten resin base, and tending as an absorbent or surface action of the encasing matted fiber to restrain the resin, even in the molten state, from flowing away from the protective matted fiber body with which it is encased. The resinous base composition further has incorporated intumescing or heat foamable substances, which upon heat activation under high temperature, fire or arcing conditions, tend to fire and flameproof the cable or other protected equipment. The insulating tape composition is converted at the high arcing or applied fire temperatures above about 350° C to a foamy charred residue of the thermoplastic resin, which remains as a protective charred and foamy thick insulating coating upon the cable. The thermoplastic composition with its fiber and fireproofing composition therein is coated upon the fabric or fiber carrier at moderate temperatures at which the thermoplastic is fluid into tape sized to be useful for mounting about the cables or cable junctures which they are intended to protect.

The resinous base substance of the tape composition is a thermoplastic which will be fluid inherently at ambient temperatures such as a plastisol, or it may be a solid thermoplastic plasticized to melt and then set at moderate temperature, usually below about 300° C and typically may comprise one of the thermoplastics such as synthetic rubber, typically polychlorobutadiene, polyethylene, ethylenepropylene, co-polymer, polyvinyl chloride or the like. These thermoplastics may vary in molecular weight from low to high, generally above 5000 molecular weight and will be selected to be moldable at a temperature below about 300° C, preferably below 200° C. The polyvinyl chloride (PVC) is preferred because it can be readily dispersed in solvating type liquids or plasticizers and whose swelling and gelating action just becomes effective when the plastisol dispersion is heated to a temperature in excess of 60° C. The preferred polyvinyl chloride resin has a viscosity of 0.9 to 2.25 CPS as a 1% solution in cyclohexane at 30° C, but commonly in a preferred range of 1.10 to 2.10 CPS.

Generally, a plastisol is a blend of several dispersion grade, solvatable polyvinyl chloride (PVC) resins. It is fine-mixed with coarser particles, and dispersed in a mixture of plasticizers.

Thermoplastic resins hereof are either solvated with a solvent to the plastisol form or may be plasticized so that it will flow with moderate heat, preferably below about 200° C for coating and shaping as will appear. It is preferred that the plasticizer be a fireproofing, fire-retardant type of fluid. For that purpose it will be an organic phosphate, ester or chloride, generally of high molecular weight either aliphatic or aromatic in character. Suitable plasticizers are halogenated hydrocarbons, typically chlorinated or brominated paraffin waxes, polychlorinated carbocyclic compounds, such as hexachloro cyclo hexane, octa chloro naphthalene, octo chloro diphenyl and chlorinated terpenes. Phosphoric esters, typically cresyl diphenyl phosphate, alkyl phosphonium halides, typically as shown in U.S. Pat. No. 3,322,861, tetrachloro or tetrabromo phnthalic anhydride, phthalic acid esters of higher alcohols having 4 to 20 carbon atoms and such higher alcohol esters of dibasic carboxylic acids, such as adipic or sebasic acid, in which the acid group has 4 to 8 carbon atoms and the alcohol from 4 to 20 carbon atoms, and the alcohol or acid is preferably substituted with halogens such as chlorine or bromine, such as dibutyl tetra-bromo phthalate, di (hexachloro decyl) adipic acid. The plasticizer can be diluted with heavy heat stable hydrocarbon liquids which will solvate the plasticizer and operate merely as an extender, typical extenders are heavy aromatic oils.

The thermoplastic resins and plasticizer composition, when and preferably in the form of plastisol flows at ambient temperature such that it can be used for dipping, filling of molds for atmospheric pressure molding, or for rotational casting in electroformed, cast metal or ceramic molds that can be heated while in motion. The plastisol will gelate, becoming first solid, than fusing into a homogeneous mass as the temperature is increased. Typically, blends of PVC resins of varying particle sizes are used to provide a packing effect and regulate viscosity. The vinyl coating from a plastisol is most easily applied, and items dip molded therefrom by bringing any hot surface, metal or ceramic into contact with it. Upon dipping the preheated form in the plastisol, gelation first occurs and the thickness of such gelled coating is regulated by the duration of immersion and temperature of the dipping form. The resultant coated form is slowly withdrawn and the plastisol still adhering rapidly gelates. Normally there may be sufficient heat in the form or mandrel to complete the fusion up to coating thicknesses of 0.030-0.050. However, with thicker deposites, i.e., in the range of 0.060 to 0.300 in which this invention is best practiced, it becomes necessary to complete the fusion by the application of additional heat at 150° to 200° C.

The chlorinated or brominated plasticizer will evolve halogen at high flame or arcing decomposition above about 400° C temperature but it cooperates with other volatizable fire-retardant compounds in the composition which together react at the heat decomposition temperature to form compounds which have a fire-proofing or retarding effect. Such other compounds typically are antimony oxide alone or coated upon calcium carbonate and organic borate complexes, usually with carboxylic acids including naphthenic acid. Other useful plasticizers comprise chlorinated and/or brominated derivatives of dioctyl phthalate, didecyl phthalate, normal octyl-normal decyl phthalates (mixed), diallyl phthalate, butyl benzyl sebacate, etc.

Suitable organic phosphate ester plasticizers include, for example, tris (2,3-dibromopropyl) phosphate, tri (bromocresyl)phosphate trichloroethylphosphate, tri(-bromoxylenyl) phosphate and the like.

Non-halogenated dicarboxylic acid ester plasticizers may also be used to supplement the fire-retarding (halogen or phosphorous containing) plasticizer and may be added in amounts up to about 90 percent by weight of the total plasticizers. Advantageously, at least about 20 weight percent of the total plasticizers is supplied by chlorinated hydrocarbons.

The resinous composition further includes a heat stabilizer substance which is usually a complex salt or organic or inorganic acid of such elements as barium, cadmium or zinc of which its typical compounds are napthenates or thiolates of these metals. Other heat stabilizing salts such as lead phosphate, lead phosphite, zinc phosphite and barium phosphite.

Suitable stabilizers are those which normally exist as solids, and include, for example, dibasic lead phthalate, dibasic lead phosphate, tin mercaptides, etc. A preferred heat stabilizer is dibasic lead phosphite.

The resinous composition further includes a fiber stabilizer which are short fiber lengths generally ranging longer from about ⅛ of an inch, indefinitely longer, usually less than 1½ inches, the size being of significance only in that the liquid composition is difficult to mix homogeneously with a longer fiber. Consequently, the fiber length will usually be in the range of ¼ to ¾ inches. The fiber is homogeneously mixed with the resin and fire-retardant heat stabilizer substances. The fibers as stated are heat stable and will resist heat decomposition in the composition generally above the temperature of the decomposition temperature of the resin per se, usually above 350° C so that as the composition begins to decompose with heat the fiber nevertheless tends to hold the fluidized body, fused under heat, from flowing away from the flame or arc. The fibers are evenly distributed throughout the resinous body in quantity usually exceeding about 1 part and may range from about 1 to 10 parts by weight of fiber per 100 parts of base, usually ½ and 3 parts will suffice to provide this function. The fiber of this purpose may be glss fiber or a nylon type of heat resistant fiber such as a polyamide typically aramide which is available commercially by DuPont under the trade name Nomex. Other inorganic fibers such as barium titanate, carbon filament, asbestos, graphite, fiberglass or other high temperature stable fibers can be used.

The composition preferably further includes intumescing or foaming components which constitute a porous inorganic body which occludes air or moisture and which upon heating tends to expand by release of the occluded air or vaporization of absorbed or bound moisture, whereby the resinous composition intumesces or expands as a foamy body under high temperatures generally above about 350° C. Such components may be micas such as expanded or unexpanded vermiculite, pearlite, bentonite or various hydrous oxides typically hydrous alumina, hydrous magnesia, hydrous silica, ferric hydroxide or the like. Such components tend to evolve steam when heated to an activating temperature, even lower than the critical temperature stated such as, beginning to evolve the moisture as low as about 220° C variable with the specific substance and cause the composition to expand into a foam. The gas evolving component may be cenospheres, tiny glassy balls obtained as fly ash.

The cenospheres are included in the plastisol composition in amounts of about 1 to 25, preferably about 5 to 25 parts per 100 parts by weight of polyvinyl chloride. Their presence in the plastisol affords a multiplicity of advantages: increased flame resistance, lower density, lower thermal conductivity, improved thixotropic properties and lower cost. Cenospheres are chemically inert, hollow, glassy microspheres obtained from the ash remaining after burning pulverized coal. At the coal burning electricity generating stations where cenospheres may readily be obtained, the pulverized coal ash is made into a slurry with water and pumped into a lagoon. The cenospheres, which make up from about 0.5 to 5% weight of the ash, float to the surface with small carbon particles adhering to them and may be collected. Cenospheres have a Moh's hardness of about 5. After washing and drying they have a bulk density of from 0.25 to 0.35 $grm/cm^{-3}$ and individual cenospheres have densities varying from 0.4 to 0.6 $grm/cm^{-3}$. Their particle sizes are generally in the range of about 5 to 150 $\mu$. About 5% have diameters less than 50 $\mu$ and about another 20% have diameters greater than 125 $\mu$. The wall thickness is about 5% of the diameter.

Cenospheres have a melting point of about 120° C, and are made of what is essentially a silicate glass. The composition varies from batch to batch, as is shown in the following table:

| Component | Weight % |
| --- | --- |
| Silica | 55 to 61 |
| Alumina | 26 to 30 |
| Iron Oxides (as $Fe_2O_3$ | 4 to 10 |
| Calcium (as CaO) | 0.2 to 0.6 |
| Magnesium (as MgO) | 1 to 2 |
| Alkalis (as $Na_2O$, $K_2O$) | 0.5 to 4.0 |
| Carbon | 0.01 to 2.0 |

The properties of cenospheres are discussed in greater detail in a paper by E. Raask (J. Institute of Fuel, Sept. 1958, p. 339) and in a Technical Bulletin (Nov. 22, 1967) issued by the Central Electricity Generating Board, London, England.

The cenospheres containing gas require a somewhat higher temperature such as above 350° C to expand and consequently in combination moisture evolving type such as hydrous oxide the protective effect upon the expanding coating on the arcing cable is substantially enhanced.

Other useful but not essential components in the composition are pigments, fungicides and inert fillers such as calcium carbonate and the like.

The following is a general formulation of the protective composition in which the quantities are all based on the resin component set at 100 parts by weight.

| | Component | Parts by Weight |
| --- | --- | --- |
| a. | Thermoplastic resin | 100 |
| b. | Flame retarding plasticizer (preferred range 50–125) | 10–150 |
| c. | Heat stabilizer (preferably 1.5–3) | 1–5 |
| d. | Fire-retardant intumescing component (preferably 50–125) | 10–150 |
| e. | Heat resistant short fibers (preferably 1.5–3) | 1–4 |
| f. | Other components (pigments, fungicides, etc.) Optional | Q.S. |

The fabric base upon which the heat liquified insulating material is deposited is a fabric backing such as matted or woven glass, spun bonded polyester, a Dupont fabric sold under the trade name Remay, or it may be the same fire resistant aramid, or Nomex fiber, or other common fiber base sheet-like substances of sufficient inherent tearing or bursting strength preferably resistant in that respect to 50–250 pounds of pull or pressure. The fiber sheet may be woven, knitted, netted, into sheet-like from upon which the fire and arc protective resinous composition in fluidized form is applied. The thickness of the resinous coating on the tape will generally range from about 0.025 to 0.300, more usually between 0.25 and 0.20 preferably applied by knife coating thereon.

The physical mixing of the resin or plastisol components may follow known mixing methods. It is preferred in forming the composition into tapes to mix the resins, including the plasticol resin with a substantial portion in the quantity of about one-half to two-thirds of the liquid plasticizer and extended oil with the solids, heat stabilizer, antimony oxide and hydrous oxides, added in sequence with mixing in a dough mixer. Then the heat stabilizer fibers are added and finally the cenospheres together with the final portion of the plasticizer, blending continuously with slow mixing until substantially homogeneity is achieved. In the case of the thermoplastic resins the resin mixture is heated while mixing until soft at a temperature from about 150° to 300° C, variable with the specific resin, and sometimes where the plastic requires working to effect the blending, on mixing rolls to homogenize the composition. In such instance usually the hot melt slowly mixed suffices to homogeneously distribute the solids in thermoplastic resin. In the case of the plastisol, which may be initially fluid without heat, the blending is relatively easy and is effected in a simple slow mixing dough mixer.

The fluid coating after homogeneously mixing is then applied to the fabric, such as with a knife blade, as known in the art, and wherein the plastic has been heated to soften it for purposes of coating, it can be merely cooled after coating the fabric. In the case of the plastisol, the coating material already fluid at ambient temperatures, after coating upon the backing fabric needs to be heated to a moderate temperature from about 150° to 200° C for purposes of setting the coating by gelation, for which purpose it is passed through an oven heated to the said temperature to effect the gelation. In the case of a thermoplastic resin base, the resin already to fusion of blending with the fine stabilizing components needs no further heat, but may be tempered for firm bonding to the tape by maintaining the hot coated tape at a temperature of thermoplasticity for a period of 10–30 minutes to secure a firm coating upon the fabric before cooling.

Figure 2:
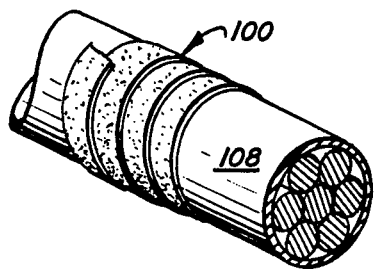

The invention is further described by reference to the drawings showing:

FIG. 1 is a tape showing a section of the tape having a portion broken away showing the coating upon the fabric backing and the fibrous filler; and FIG. 2 illustrates the tape wound upon a cable in its normal use for fire, arcing and flameproofing thereof.

Referring to FIG. 1, the tape 100 comprises a fiber base or backing sheet 102 which can be any woven, knitted or matted fiber, upon which the resinous base flexible coating 104 is applied in its normally soft, as in a plastisol, or heat softened state, whereby the coating firmly bonds to the backing tape 102. That coating substance has numerous heat stable fibers 106 distributed throughout its body which acts as a matting fiber or filler, holding the plastic in its fluid or molten condition, particularly when heated by arcing or flame and preventing it from flowing away from its position wrapped about a cable 108.

The following examples illustrates the practice of this invention.

EXAMPLE I

Polyvinyl chloride plastisol in quantity of 72 parts mixed with 28 parts of polyvinyl extender resin, a coarser polyvinyl chloride of particle size in the rangeof about 50–100 mesh, is blended in a dough mixer with 92 parts of cresyl diphenyl phosphate, 23 parts of chlorinated paraffin wax (chlorowax 500) and an extender of 24 parts of heavy aromatic oil, such as a mixture of lower akyl benzenes (Eseoflex 150), and a heat stabilizer, a mixture of barium, cadium and zinc thiolates with small quantities of lead napthenate in quantity of 2 parts, all parts being by weight. Into the mix is added 3 parts of antimony oxide, 60 parts of hydrous alumina having 38% of water of hydration and 40 parts cenospheres (fly ash). There is further added 2 parts of heat stable fibers which are fire-resistant aramids having mixed lengths between ¼ inch and ⅜ of an inch sold by Dupont as fiber floc under the tradename NOMEX. Finally, 7 parts of titanium dioxide pigment, 1 part of calcium oxide and 1 part of fungicide 10'10' oxybis phenoxarsene (vinyzene BP.5). The components are mixed in a dough mixer at room temperature, first supplying all but about ¼ of the heavy plasticizer and extender liquids, and then in 3 small increments the polyvinyl chloride, first blending one to complete liquidity before the next is added, and thereafter the solids are stirred into the mixture with slow continuous mixing. A small amount of a final quantity of plasticizer is added to as a final thinner with the last added cenospheres. The final fluid mix has a viscosity of about 1000–45000 cps at 25°–27° C measured with a number six spindle at about 10 rpm.

The composition is coated by knife coating said plastisol composition upon a REMAY woven fiber, which is a spun polyester terephthalate fiber, sold by the Dupont Company under that trade name. The wet-coated fabric base with the coating thereon of about 0.055 inches thick, is passed through an oven at a temperature of 165° C in which it is slowly heated for a period of 20 minutes whereby the plastisol sets up to a strong gel. It is cooled in air, slit in appropriate widths and then wrapped about a cable as a flexible protective arc and fire protective wrapping thereon. The wrapped cable was exposed by mounting it above the hottest point of a tip of a flame of a Fisher burner, having a temperature of 1700° F (plus or minus 50° F). The lead sleeve protected by the tape did not melt down in a 20 minute exposure to this flame. Moreover, a thermo couple inserted within the lead sleeve to measure the actual temperature thereof during the test, showed a temperature ranging from 75°–195° F, well below the melting point of the lead, indicating the great heat insulating and fire protective merit of this tape.

EXAMPLE II

Example I was repeated except that the cenospheres, alumina hydrate, as well as the heat resistant fiber was omitted from the formulation, substituting 50 parts of calcium carbonate, ground marble, as filler and the coated tape was formed as described in Example I, and wrapped about a lead sleeve. It was similarly heated by a Fisher burner flame. The tape protected lead sleeve melted in 1.25 minutes indicating that the fiber, alumina hydrate and cenospheres, contribute largely to the insulation effect provided by the composition. Again, when the heat resistant fiber was omitted from the composition, thus still including alumina hydrate and cenospheres, the lead sleeve was completely melted in less than 10 minutes. It is clear that both the fiber and fireproofing intumescing components of this composition contribute substantially to the heat protective value of the tape hereof.

Certain modifications will occur to those skilled in the art. Many other commonly used components of the fireproofing composition may be included here. Other stabilizer substances of the character of heat stabilizers, fungicides, pigments of the like may be varied. The term "coated tape" is used herein in a generic sense to include extrusion, spray, knife or doctor coating even in laminated or layer form, and othe forming processes for the solid plastic coated tape hereof may be used.

Accordingly, it is intended that the description be regarded as exemplary and not limiting except as provided in the claims.

I claim:

1. An electrical arc and fire protective tape for disposition about electrical equipment, cables, cable splices, appurtenant equipment or the like, comprising a resinous mixture coated as a heat fused film of thermoplastic resinous particles in a plasticizer upon a fabric base, said resinous film having evenly distributed therein a heat resistant fiber, heat stable over the melting point of said thermoplastic film, and fire-retardant and intumescing substances, said fiber adapted to hold the heat moltent thermoplastic from flowing, said resinous coating mixture containing no water other than chemically combined water, said fire-retardant and intumescing substances in coated position upon the fabric base protectively mounted about said electrical equipment being heat activated at high arcing and flaming temperatures to release fire protective gases to convert said protective coating into a heat insulating foam upon said electrical equipment.

2. The electrical arc and flame protective tape as defined in claim 1 wherein the resinous mixture comprises a plastisol, the fiber therein is heat stable above 300° C and said composition contains a fire-retardant liquid plasticizer.

3. The electrical arc and fire protective tape as defined in claim 2 wherein the heat resistant fiber is short lengths of aramid.

4. The electrical arc and fire protective tape as defined in claim 1 wherein the resinous mixture comprises polyvinyl chloride plastisol, the heat resistant fiber is aramide and the intermescing substance is a member of the group consisting of cenospheres, hydrous oxides and metals forming heat volatizable halides.

5. The composition as defined in claim 4 further including a heat stabilizing substance for said plastisol.

6. The electrical arc and fire protective tape as defined in claim 2 wherein the thermoplastic base is a heat set plastisol with a fire-retardant plasticizer having a fiber heat stable at 300° C, and a heat stabilizer for said plastisol.

7. The electrical arc and fire protective tape as defined in claim 1 wherein the fabric base is a member of the group consisting of aramid fiber, glass fiber and polyester fiber in woven, knitted, netted or matted form.

8. The electrical arc and fire protective tape as defined in claim 1 wherein the coating upon the fabric has a thickness in the range of 0.025 to 0.300 inches.

9. A method for forming an electrical arc and fire resistant tape comprising coating a fabric base with an evenly blended mixture of a fluid plastisol of a thermoplastic resin having a heat stable fiber therein, a heat stabilizer for said plastisol and fire protective intermescing substances incorporated therein, coating said fluid composition upon said fabric base and then setting said composition to flexible solid state thereon.

* * * * *